(12) United States Patent
Wang et al.

(10) Patent No.: US 12,090,779 B2
(45) Date of Patent: Sep. 17, 2024

(54) SMOOTH OBSTACLE-CROSSING WALKING MECHANISM

(71) Applicant: Dalian University of Technology, Dalian (CN)

(72) Inventors: Xiaoxu Wang, Dalian (CN); Kangsheng Lai, Dalian (CN); Jinglong Wang, Dalian (CN)

(73) Assignee: Dalian University of Technology, Dalian (CN)

( * ) Notice: Subject to any disclaimer, the term of this patent is extended or adjusted under 35 U.S.C. 154(b) by 585 days.

(21) Appl. No.: 17/401,352

(22) Filed: Aug. 13, 2021

(65) Prior Publication Data

US 2022/0219487 A1    Jul. 14, 2022

(30) Foreign Application Priority Data

Jan. 12, 2021   (CN) .......................... 202110039103.9

(51) Int. Cl.
*B60B 11/02*   (2006.01)
*B60B 19/00*   (2006.01)

(52) U.S. Cl.
CPC ............... *B60B 11/02* (2013.01); *B60B 19/00* (2013.01); *B60B 2900/551* (2013.01)

(58) Field of Classification Search
CPC .... B60B 11/02; B60B 2900/551; B60B 19/00
See application file for complete search history.

(56) References Cited

U.S. PATENT DOCUMENTS

| 6,414,457 | B1* | 7/2002 | Agrawal | B25J 5/00 180/21 |
|---|---|---|---|---|
| 8,137,152 | B2* | 3/2012 | Tsai | G05D 1/0033 446/456 |
| 10,150,013 | B2* | 12/2018 | Paarporn | A63H 15/00 |
| 10,377,231 | B2* | 8/2019 | Özgür | B60B 19/14 |
| 10,921,818 | B2* | 2/2021 | Ogawa | G05D 1/0255 |
| 2008/0097644 | A1* | 4/2008 | Kaznov | A63H 30/04 700/47 |
| 2014/0345957 | A1* | 11/2014 | Bernstein | G05D 1/0044 180/21 |
| 2016/0325585 | A1* | 11/2016 | Hays | B60L 3/00 |
| 2018/0043952 | A1* | 2/2018 | Ellerman | B60K 1/00 |
| 2022/0219487 | A1* | 7/2022 | Wang | B60B 19/00 |

* cited by examiner

*Primary Examiner* — Kevin Hurley
*Assistant Examiner* — Marlon A Arce
(74) *Attorney, Agent, or Firm* — Shih IP Law Group, PLLC

(57) ABSTRACT

The present disclosure belongs to the technical field of walking mechanisms, and provides a smooth obstacle-crossing walking mechanism, which can provide strong smooth obstacle crossing capability, meanwhile, maintains lower friction loss and higher efficiency, and is suitable for most daily use situations. A smooth obstacle-crossing walking mechanism includes a driving wheel and a contact wheel. The driving wheel has a wheel diameter lower than that of the contact wheel. The driving wheel compresses an inner edge of the contact wheel under gravity. The contact wheel is in contact with the ground surface. When the driving wheel rotates actively, it walks along the inner edge of the contact wheel under the frictional force with the contact wheel. The contact wheel rolls forwards under a pressure and the frictional force of the driving wheel, so as to enable the smooth obstacle-crossing walking mechanism to walk.

5 Claims, 3 Drawing Sheets

SMOOTH OBSTACLE-CROSSING WALKING MECHANISM

CROSS REFERENCE TO RELATED APPLICATION(S)

This application claims the priority of Chinese Patent Application No. 202110039103.9, entitled "smooth obstacle-crossing walking mechanism" filed with the Chinese Patent Office on Jan. 12, 2021, which is incorporated herein by reference in its entirety.

TECHNICAL FIELD

The present disclosure belongs to the technical field of walking mechanisms, and particularly relates to a smooth obstacle-crossing walking mechanism.

BACKGROUND ART

At present, walking mechanisms existing on the market are mainly divided into two types, namely a wheel type and a track type. Among them, the wheel type walking mechanisms are the mainstream, for example, four-wheel vehicles, four-wheel electric vehicles, two-wheel balance vehicles, and two-wheel electric vehicles. The wheel type walking mechanisms have the advantages of low loss of friction with the ground and high efficiency, and are suitable for traveling on relatively flat road surfaces. However, the performance of the wheel type walking mechanisms is not ideal when encountering obstacles, for example, a step. Their obstacle crossing capability depends on wheel diameters and drive capability. Sudden change of height is easily caused when the wheel type walking mechanisms cross the obstacles, for example, the sudden change of height makes the riding experience poor when the wheel type walking mechanisms go up and down stairs. The track type walking mechanisms have strong obstacle crossing capability. However, such mechanisms have great frictional forces with the ground and very low efficiency, so they are not suitable for daily use. In addition, sudden change of height is also easily caused when the track type walking mechanisms cross the obstacles, for example, sudden change of height will be caused when the track type walking mechanisms start to go down steps from flat ground, or go up to the top end of the steps and start to walk on the flat ground, so the riding experience is very poor.

SUMMARY

The objective of the embodiments is to provide a smooth obstacle-crossing walking mechanism, which can provide strong smooth obstacle crossing capability, meanwhile, maintains lower friction loss and higher efficiency, and is suitable for most daily use situations.

The technical solution of the present disclosure:

A smooth obstacle-crossing walking mechanism includes a driving wheel 1 and a contact wheel 2. The driving wheel 1 has a wheel diameter lower than that of the contact wheel 2. The driving wheel 1 rotates around its own axle under a driving force. The driving wheel 1 compresses an inner side of the contact wheel 2 under a gravity of a vehicle body. The contact wheel 2 is in contact with the ground surface. When the driving wheel 1 rotates actively, and in turn walks along an inner edge of the contact wheel 2 under a frictional force with the contact wheel 2. The contact wheel 2 rolls forwards under a pressure and the frictional force of the driving wheel 1, so as to enable the smooth obstacle-crossing walking mechanism to walk.

The axle of the driving wheel 1 may be connected and fixed to an axle of the contact wheel 2 via a connecting piece 3. The connecting piece 3 may be connected to the axle of the driving wheel 1 via a bearing or a bearing bush. The connecting piece 3 may be connected to the axle of the contact wheel 2 via a bearing or a bearing bush. The connecting piece 3 may allow the axle of the driving wheel 1 and the axle of the contact wheel 2 to be parallel to each other and the relative distance therebetween to be maintained unchanged, and may allow good contact between the driving wheel 1 and the contact wheel 2 under conditions of traveling, steering, obstacle crossing, bumping and the like.

The smooth obstacle-crossing walking mechanism may be provided with multiple auxiliary wheels 4. The multiple auxiliary wheels 4 may be connected to the driving wheel 1 through fixing pieces 5. The fixing pieces 5 are connected to the axle of the driving wheel 1 via bearings or bearing bushes. The fixing pieces 5 may fix the relative positions between the multiple auxiliary wheels 4 and the driving wheel 1. The auxiliary wheels 4 may rotate freely or have an active driving capability. The auxiliary wheels 4 may be used for assisting in strengthening a structural strength of the contact wheel 2. The active driving capability of the auxiliary wheels 4 may increase frictional forces between the auxiliary wheels 4 and the contact wheel 2, and in turn may increase whole driving capability.

The axle of the driving wheel 1, the auxiliary wheels 4, the fixing pieces 5, and the axle of the contact wheel 2 may be connected together through the connecting piece 3. The connecting piece 3 is connected to the axle of the driving wheel 1 via a bearing or a bearing bush. The connecting piece 3 is connected to the axle of the contact wheel 2 via a bearing or a bearing bush. The connecting piece 3 allows the axle of the driving wheel 1 and the axle of the contact wheel 2 to be parallel to each other and the relative distance therebetween to be maintained unchanged.

The driving wheel 1 may be engaged with the contact wheel 2 through a first gear structure.

The auxiliary wheels 4 may be engaged with the contact wheel 2 through a second gear structures.

The embodiments has the effects and the benefits that the contact wheel with the relatively large wheel diameter achieves an effect of "bridging" when contacting an obstacle, and the driving wheel with the relatively small wheel diameter actually travels on a "bridge" built by the contact wheel with the relatively large wheel diameter, so as to avoid the sudden change of the height, and realize smooth obstacle crossing. For example, when the smooth obstacle-crossing walking mechanism walking on the flat ground encounters steps and needs to go down the steps, and when the driving wheel walks forwards until the center of the driving wheel deviates from the center of the contact wheel, the contact wheel performs downward inclined movement under the downward pressure of the driving wheel, and the contact wheel stops moving until being in contact with the next step, so as to complete the "bridging" to the next step. During the process, the height of the contact wheel changes suddenly, but the height of the driving wheel does not change suddenly. The driving wheel continues walking and smoothly descends to the height of the next step along the "bridge" that is built by the contact wheel, so as to complete smooth obstacle crossing. When the smooth obstacle-crossing walking mechanism walking on the flat ground encounters steps and needs to go up the steps, the contact wheel first contacts an upper step and then stops moving to complete "bridging", while the driving wheel continues performing rotating movement and smoothly walking to the height of the upper step along the "bridge" built by the contact wheel, and the contact wheel moves upwards in an inclined manner to the height of the plane of the upper step under the downward pressure of the driving wheel. During the process, the height of the contact wheel changes suddenly, but the height of the driving wheel is not changed. The driving wheel drives the contact wheel to continue walking normally, so as to complete smooth obstacle crossing.

Figure 1:
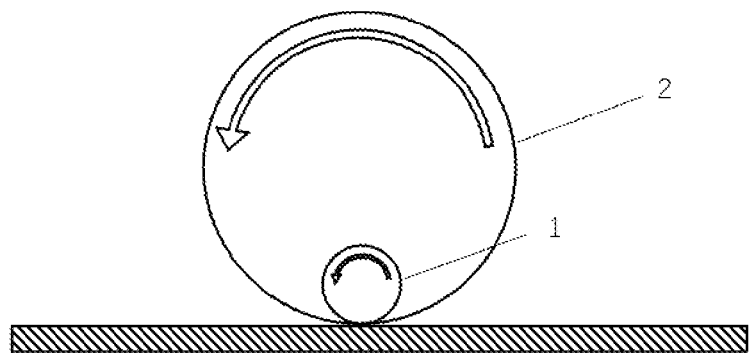
FIG. 1 is a schematic diagram showing embodiment 1 of a smooth obstacle-crossing walking mechanism of the present disclosure.
Figure 2:
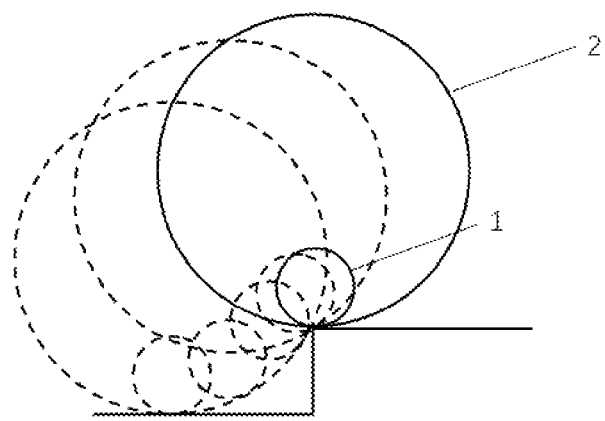
FIG. 2 is a schematic diagram of embodiment 1 of the smooth obstacle-crossing walking mechanism of the present disclosure during crossing an obstacle.

Reference numerals in drawings: 1 driving wheel; 2 contact wheel; 3 connecting piece; 4 auxiliary wheel; 5 fixing piece.

DETAILED DESCRIPTION OF THE EMBODIMENTS

Specific embodiments of the present disclosure will be described below in detail with reference to technical solutions and accompanying drawings.

Specific embodiments of the present disclosure are described with reference to FIG. 1. A driving wheel 1 has a relatively small wheel diameter, and a contact wheel 2 has a relatively large wheel diameter. The driving wheel 1 may rotate around its own axle under a driving force. The driving wheel 1 compresses an inner side of the contact wheel 2 under the gravity of a vehicle body. The contact wheel 2 is in contact with the ground surface. When the driving wheel 1 rotates actively, it walks along the inner edge of the contact wheel 2 under the frictional force with the contact wheel 2. The contact wheel 2 rolls forwards under the actions of the pressure and the frictional force of the driving wheel 1, so as to realize the walking of the smooth obstacle-crossing walking mechanism.

Figure 3:
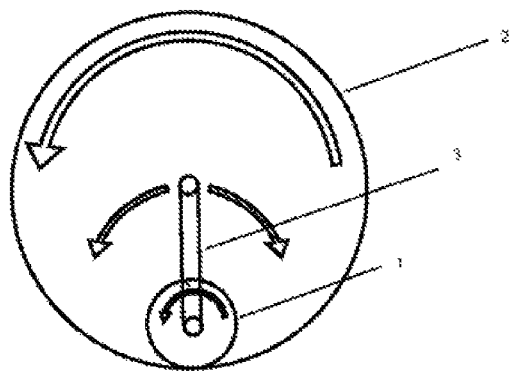
FIG. 3 is a schematic diagram showing embodiment 2 of the smooth obstacle-crossing walking mechanism of the present disclosure.
Figure 4:
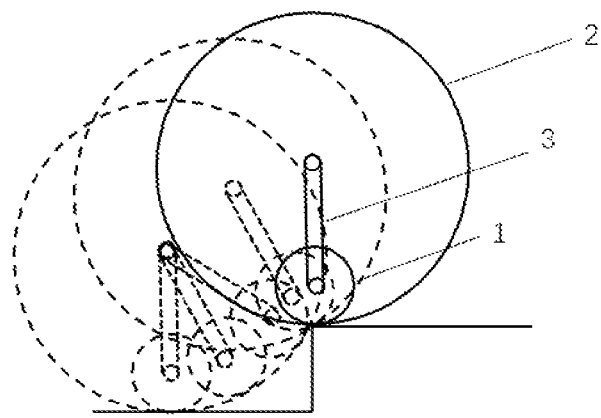
FIG. 4 is a schematic diagram of embodiment 2 of the smooth obstacle-crossing walking mechanism of the present disclosure during crossing the obstacle.

Specific embodiments of the present disclosure are described with reference to FIG. 3. The axle of the driving wheel 1 is connected and fixed to the axle of the contact wheel 2 via a connecting piece 3. The connecting piece 3 is connected to the axle of the driving wheel 1 via a bearing or a bearing bush. The connecting piece 3 is connected to the axle of the contact wheel 2 via a bearing or a bearing bush. The connecting piece 3 ensures that the axle of the driving wheel 1 and the axle of the contact wheel 2 are parallel to each other and the relative distance therebetween is maintained unchanged, and ensures good contact between the driving wheel 1 and the contact wheel 2 under the conditions of traveling, steering, obstacle crossing, bumping and the like.

Figure 5:
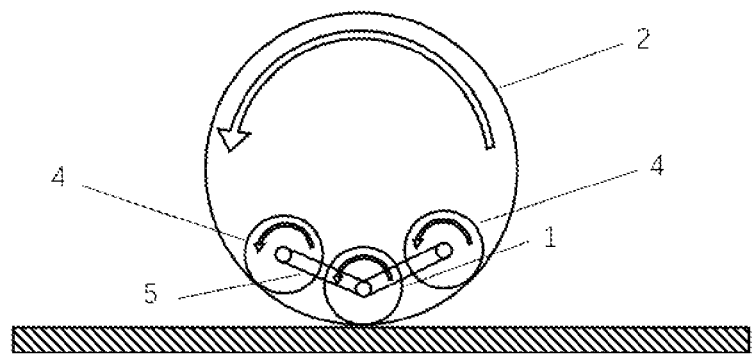
FIG. 5 is a schematic diagram showing embodiment 3 of the smooth obstacle-crossing walking mechanism of the present disclosure.

Specific embodiments of the present disclosure are described with reference to FIG. 5. The smooth obstacle-crossing walking mechanism may be provided with multiple auxiliary wheels 4. The multiple auxiliary wheels 4 are connected to the driving wheel 1 through fixing pieces 5. The fixing pieces 5 are connected to the axle of the driving wheel 1 via bearings or bearing bushes. The fixing pieces 5 fix the relative positions between the multiple auxiliary wheels 4 and the driving wheel 1. The auxiliary wheels 4 may rotate freely or may have the active driving capability. The multiple auxiliary wheels 4 have the main effect of assisting in strengthening the structural strength of the contact wheel 2. If the multiple auxiliary wheels 4 have the active driving capability, then the multiple auxiliary wheels 4 may also have the effects of increasing the frictional force with the contact wheel 2, thereby increasing the driving capability.

Figure 6:
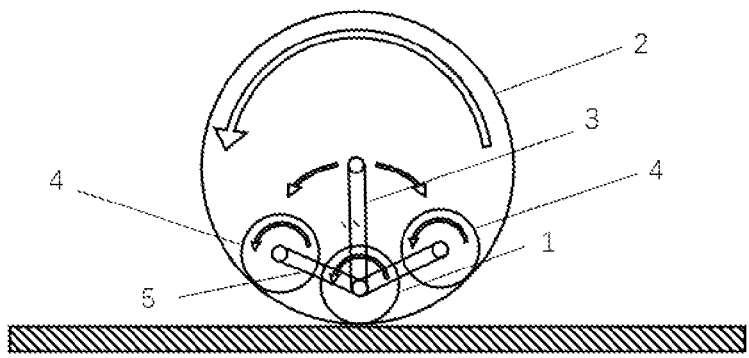
FIG. 6 is a schematic diagram showing embodiment 4 of the smooth obstacle-crossing walking mechanism of the present disclosure.

Specific embodiments of the present disclosure are described with reference to FIG. 6. The axle of the driving wheel 1, the multiple auxiliary wheels 4, the fixing pieces 5, and the axle of the contact wheel 2 are connected together through the connecting piece 3. The connecting piece 3 is connected to the axle of the driving wheel 1 via a bearing or a bearing bush. The connecting piece 3 is connected to the axle of the contact wheel 2 via a bearing or a bearing bush. The connecting piece 3 ensures that the axle of the driving wheel 1 and the axle of the contact wheel 2 are parallel to each other and the relative distance is maintained unchanged.

Figure 7:
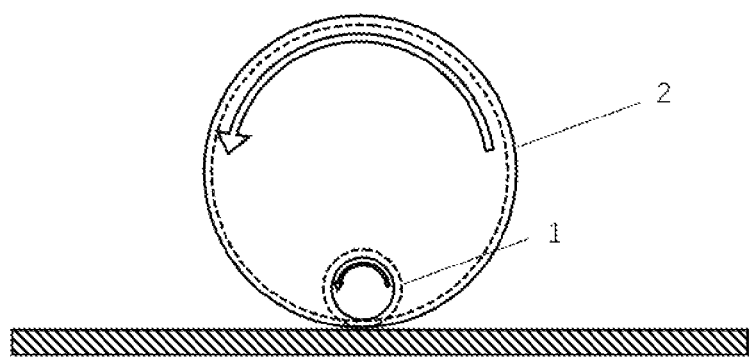
FIG. 7 is a schematic diagram showing embodiment 5 of the smooth obstacle-crossing walking mechanism of the present disclosure.

Specific embodiments of the present disclosure are described with reference to FIG. 7. The driving wheel 1 may be engaged with the contact wheel 2 through a gear structure.

Specific embodiments of the present disclosure are described with reference to FIG. 3, FIG. 5, and FIG. 6. The multiple auxiliary wheels 4 may be engaged with the contact wheel 2 through gear structures.

What is claimed is:

1. A smooth obstacle-crossing walking mechanism, comprising a driving wheel and a contact wheel, wherein the driving wheel has a wheel diameter lower than that of the contacting wheel; the driving wheel rotates around its own axle under a driving force; the driving wheel compresses an inner side of the contact wheel under a gravity of a vehicle body; the contact wheel is in contact with ground surface; when the driving wheel rotates actively, and in turn walks along an inner edge of the contact wheel under a frictional force with the contact wheel; the contact wheel rolls forwards under a pressure and the frictional force of the driving wheel, so as to enable the smooth obstacle-crossing walking mechanism to walk;

the axle of the driving wheel is connected and fixed to an axle of the contact wheel via a connecting piece; the connecting piece is connected to the axle of the driving wheel via a bearing or a bearing bush; the connecting piece is connected to the axle of the contact wheel via a bearing or a bearing bush; the connecting piece allows the axle of the driving wheel and the axle of the contact wheel to be parallel to each other and the relative distance therebetween to be maintained unchanged, and allows good contact between the driving wheel and the contact wheel under conditions of traveling, steering, obstacle crossing, and bumping;

wherein the driving wheel is engaged with the contact wheel through a first gear structure.

2. The smooth obstacle-crossing walking mechanism according to claim 1, wherein the smooth obstacle-crossing walking mechanism is provided with a plurality of auxiliary wheels; the plurality of auxiliary wheels are connected to the driving wheel through fixing pieces; the fixing pieces rotate around the axle of the driving wheel; the fixing pieces fix relative positions between the plurality of auxiliary wheels and the driving wheel; the auxiliary wheels rotate freely or have driving capability; the auxiliary wheels are used for assisting in strengthening a structural strength of the contact wheel; the active driving capability of the auxiliary wheels increases frictional forces between the auxiliary wheels and the contact wheel, and in turn increases whole driving capability.

3. The smooth obstacle-crossing walking mechanism according to claim 2, wherein the axle of the driving wheel, the auxiliary wheels, the fixing pieces, and the axle of the contact wheel are connected together through the connecting piece.

4. The smooth obstacle-crossing walking mechanism according to claim 2, wherein the auxiliary wheels are engaged with the contact wheel through second gear structures.

5. The smooth obstacle-crossing walking mechanism according to claim 3, wherein the auxiliary wheels are engaged with the contact wheel through second gear structures.

* * * * *